No. 673,459. Patented May 7, 1901.
C. STOOLFIRE & T. H. MITCHELL.
WIRE SPLICING TOOL.
(Application filed June 5, 1900.)
(No Model.)
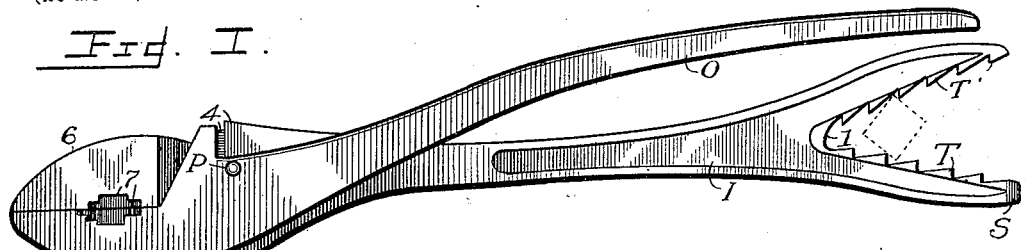
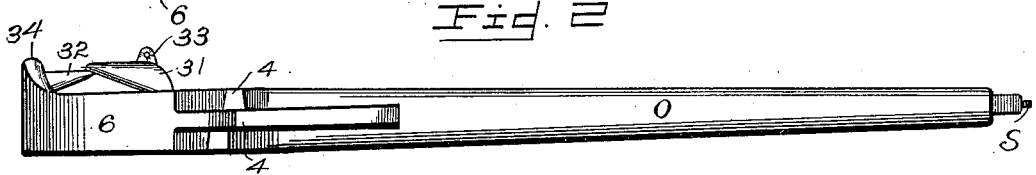
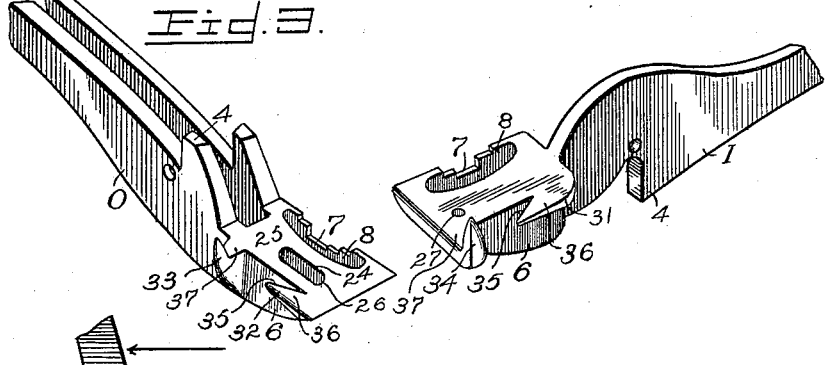
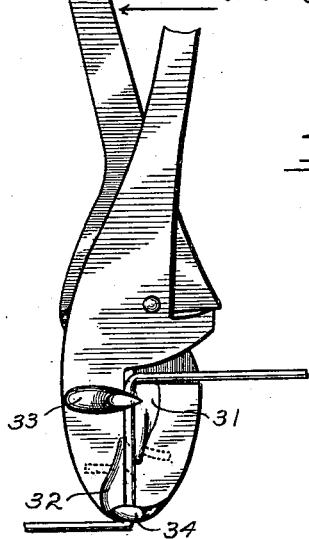
Witnesses:
Frank G Campbell
F. R. Fitton
Inventors:
Charles Stoolfire
and
Thomas H. Mitchell,
By Collamer & Co., Attorneys.
THE NORRIS PETERS CO., PHOTO-LITHO., WASHINGTON, D. C.

UNITED STATES PATENT OFFICE.

CHARLES STOOLFIRE AND THOMAS H. MITCHELL, OF MULHALL, OKLAHOMA TERRITORY.

WIRE-SPLICING TOOL.

SPECIFICATION forming part of Letters Patent No. 673,459, dated May 7, 1901.

Application filed June 5, 1900. Serial No. 19,095. (No model.)

*To all whom it may concern:*

Be it known that we, CHARLES STOOLFIRE and THOMAS H. MITCHELL, citizens of the United States, residing at Mulhall, in the county of Logan, Oklahoma Territory, have invented certain new and useful Improvements in Wire-Splicing Tools; and we do hereby declare the following to be a full, clear, and exact description of the invention, such as will enable others skilled in the art to which it appertains to make and use the same.

This invention relates to wireworking-tools, and more especially to those adapted for the twisting or splicing of wires, although, as hereinafter described, and illustrated in the drawings, the tool is set forth as embodying several other parts or features which would be of utility to the operator engaged in using the tool for the principal purpose for which it is designed.

The object of the same is to effect improvements in tools of this character, to which end the invention consists in the construction set forth below and as illustrated in the accompanying drawings, wherein—

Figure 1 is a front elevation of this tool with its jaws closed. Fig. 2 is a plan view. Figs. 3 and 4 are perspective details of the jaws of the outer and inner members, respectively. Fig. 5 is a rear elevation showing the manner of using this tool for splicing or stretching wires.

The tool consists of an outer member O, whose handle is slotted for the reception of an inner member I, the two being pivoted at P, where they cross. One end of the handle of one member, preferably the inner one, is formed with a V-shaped recess, as seen at 1, and this constitutes a wrench. The opposite walls of the recess are provided with teeth T and T', each beveled on one edge and straight on the other, like ratchet-teeth, and the straight or active faces of the teeth T face outward, while those of the teeth T' face inward. Moreover, said active faces of the two sets of teeth are not directly opposite each other, but are arranged in alternate or breakjoint positions, whereby a nut may be grasped by this form of wrench, as indicated in dotted lines, and turned with ease, rotation in the other direction being effected, as will be understood, by reversing the wrench. The extremity of one jaw may be formed into a screwdriver S.

6 6 are the arms of the members forward of the pivot P, which arms are obviously approximated like the jaws of a pair of tongs when the members are brought together. One side of these jaws is provided with registering notches 7, stepped, as seen in Fig. 1, and the meeting faces of the jaws in rear of said notches are provided with deep cavities 8, as best seen in Figs. 3 and 4. After the nut has been removed from a bolt the jaws of the tongs are applied over the head of the bolt, which passes into said cavities 8, while the stepped notches 7 grasp the square shank of the bolt beneath the head. By this means a bolt which is wedged or rusted in place can easily be withdrawn.

The parts thus far described are specially applicable to nuts and bolts, and this much of the tool forms a wrench.

In connection with the above the inner and outer members are formed adjacent the pivot P with lugs 4 properly shaped, so that their adjacent corners coact with each other as the members are closed together, and thus form a wire-cutter.

One of the jaws near its tip is provided through its body with a hole 27, while the other is provided through its body with a longitudinal slot 24, whose extremities are reduced or tapered, as at 25 and 26, the latter being so located as to be slightly in rear of and out of register with the inner end of the hole 27 when the jaws are brought tightly together. The result is that a wire fed through the hole 27 and slot 24 passes freely therethrough when the jaws are open for a little way, is given a certain amount of tension when the jaws are closed a little, and is kinked and prevented from slipping when the jaws are pressed tightly together.

Excepting the outer and inner members O and I, pivotally connected at P, all of the details thus far described are employed only by preference in connection with this tool, and we will now proceed to describe the features on which novelty is claimed in this application. It will be understood that the elements above are advantageous and useful in connection with those yet to be described, and all are by preference used in one tool for the reason that they are frequently desired by a workman employed in this line of labor.

31, 32, 33, and 34 designate four hooks secured to and projecting from that side of the jaws opposite said notches 7. The hook 31 is on the jaw of the inner member I and points toward the outer ends of the jaws, while the hook 32 is on the jaw of the outer member O and points in the opposite direction. The tips of these two hooks lap each other slightly. Their bodies are undercut adjacent the side of the jaw, as seen at 35, and their inner faces 36 are flat. The hook 33 is on the jaw of the outer member, has a shoulder 37, adapted to strike the flat inner face of the hook 31, and has a projecting point adapted to pass over the body of said hook 31, while in the same way the hook 34 is on the other jaw at its outer end, has a similar flat face 37, adapted to contact with the inner flat face 36 of the endmost hook 32, and has a point which passes over the latter. These four hooks are variously used for clamping, splicing, and stretching wires.

In Fig. 5 is shown in full lines how this tool may be used for stretching a wire and in dotted lines how it may be employed to splice two wires or to connect the meeting broken ends of one. The tool is here shown upright and being moved in the direction of the arrow, while the single wire shown in full lines passes from the right inward above the hook 31 and is clamped between it and the face 37 of the hook 33, thence passes along and is clamped between the faces of the hooks 32 and 34, and then passes out and onward to the left. The tool is applied to the wire when the latter hangs substantially straight, and the view shows it as having been turned for one-quarter of a revolution. It will be clear that by continuing the rotation in the direction of the arrow a second quarter-revolution would kink the wire and a third quarter-revolution will cause it to be twisted or coiled upon itself, the incoming strands drawing over and slipping off the upright hooks 33 and 34. As many revolutions as necessary may be made, and finally the jaws are opened to release the twisted and stretched wire. The same operation takes place in splicing a broken wire or in connecting the meeting ends of any two wires, excepting that the wire, instead of being continuous, as shown in full lines, then has its ends outturned, as indicated in dotted lines. The tool is revolved in the same direction and with practically the same results.

What is claimed as new is—

1. A tool of the character described consisting of a pair of tongs whose jaws have flat meeting faces, and a pair of oppositely-disposed hooks secured respectively to one side of said jaws and themselves having flat faces coincident with the faces of the jaws, their points lapping and contacting with each other when the jaws are closed, as and for the purpose set forth.

2. A wire-splicer consisting of a pair of tongs whose jaws carry on one side oppositely-disposed hooks with undercut points adapted to lap when the jaws are closed, as and for the purpose set forth.

3. A wire-twister consisting of a pair of tongs whose jaws carry on one side a pair of longitudinally and oppositely disposed hooks, and a pair of transversely and oppositely disposed hooks, the tips of the latter passing over the bodies of the former as the jaws are closed, as and for the purpose set forth.

4. A tool of the character described comprising a pair of tongs, a pair of longitudinally and oppositely disposed hooks located respectively on the jaws of said tongs and having flat faces coincident with the meeting faces of said jaws, and a pair of transversely-disposed hooks also located respectively on said jaws with their tips adapted to pass over the other hooks and their bodies having shoulders adapted to strike the flat faces of said other hooks when the jaws are closed, as and for the purpose set forth.

In testimony whereof we affix our signatures in presence of two witnesses.

CHARLES STOOLFIRE.
THOMAS H. MITCHELL.

Witnesses:
J. B. RICHARDS,
WM. WARNER.